(12) United States Patent
Kim et al.

(10) Patent No.: US 9,334,548 B2
(45) Date of Patent: May 10, 2016

(54) METHOD OF SEPARATING AND RECOVERING IRON FROM WASTE NON-FERROUS SLAG DISCHARGED FROM PROCESS FOR SMELTING OF NON-FERROUS METALS, INCLUDING COPPER, ZINC AND LEAD BY PHYSICAL AND CHEMICAL SEPARATION TECHNIQUE

(71) Applicant: Korea Institute of Geoscience and Mineral Resources, Daejeon (KR)

(72) Inventors: Byung-Su Kim, Jeonlabuk-do (KR); Jae Chun Lee, Daejeon (KR); Soo Bok Jeong, Daejeon (KR); Doyun Shin, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 459 days.

(21) Appl. No.: 13/989,452

(22) PCT Filed: Oct. 18, 2012

(86) PCT No.: PCT/KR2012/008535
§ 371 (c)(1),
(2) Date: May 24, 2013

(87) PCT Pub. No.: WO2014/038745
PCT Pub. Date: Mar. 13, 2014

(65) Prior Publication Data
US 2015/0000467 A1    Jan. 1, 2015

(30) Foreign Application Priority Data

Sep. 7, 2012    (KR) .................... 10-2012-0099277

(51) Int. Cl.
*C22B 5/00*       (2006.01)
*C22B 7/04*       (2006.01)
*C22B 1/00*       (2006.01)

(52) U.S. Cl.
CPC . *C22B 5/00* (2013.01); *C22B 1/005* (2013.01); *C22B 7/04* (2013.01); *Y02P 10/212* (2015.11)

(58) Field of Classification Search
CPC .............. C22B 1/005; C22B 5/00; C22B 7/04
USPC ............................................................ 75/10
See application file for complete search history.

(56) References Cited

U.S. PATENT DOCUMENTS

| | | | | |
|---|---|---|---|---|
| 4,521,385 A | * | 6/1985 | Brandstatter | ....... C22B 34/1222 209/214 |
| 8,518,146 B2 | * | 8/2013 | Li | ........................... C22B 1/248 75/359 |

FOREIGN PATENT DOCUMENTS

| | | |
|---|---|---|
| KR | 2002-0036075 A | 5/2002 |
| KR | 2002-0051631 A | 6/2002 |
| KR | 10-2005-0076556 A | 7/2005 |

*Primary Examiner* — Jie Yang
(74) *Attorney, Agent, or Firm* — Hultquist, PLLC; Steven J. Hultquist

(57) ABSTRACT

The present invention provides a method of separating and recovering iron from a waste non-ferrous slag, generated in a process for smelting of non-ferrous metals, including copper, zinc and lead, in which a reducing agent and a reaction catalyst are added to the crushed waste non-ferrous slag, and the mixture is subjected to a reduction reaction, thereby converting amorphous iron oxides, bound to alumina, calcium oxide, magnesium oxide, silica, and the like in the waste non-ferrous slag, to crystalline iron (Fe) and iron carbide ($Fe_2C$); the resulting material is crushed to separate iron and iron carbide obtained by the reduction reaction from components such as alumina, calcium oxide, magnesium oxide, silica, and the like; the crushed material is separated into fractions by particle size; and the fractions are subjected to wet magnetic separation and dry magnetic separation to separate and recover magnetic iron concentrates from the fractions.

6 Claims, 4 Drawing Sheets

METHOD OF SEPARATING AND RECOVERING IRON FROM WASTE NON-FERROUS SLAG DISCHARGED FROM PROCESS FOR SMELTING OF NON-FERROUS METALS, INCLUDING COPPER, ZINC AND LEAD BY PHYSICAL AND CHEMICAL SEPARATION TECHNIQUE

CROSS-REFERENCE TO RELATED APPLICATIONS

This application is a U.S. national phase under the provisions of 35 U.S.C. §371 of International Patent Application No. PCT/KR12/08535 filed Oct. 18, 2012, which in turn claims priority of Korean Patent Application No. 10-2012-0099277 filed Sep. 7, 2012. The disclosures of such international patent application and Korean priority patent application are hereby incorporated herein by reference in their respective entireties, for all purposes.

TECHNICAL FIELD

The present invention relates to a method for recovering iron used as an iron or steel raw material from a waste non-ferrous slag discharged as an industrial waste. More particularly, the present invention relates to a method of separating and recovering iron from a waste non-ferrous slag, discharged from a process for smelting of non-ferrous metals, including copper, zinc and lead by a physical and chemical separation technique in which a waste non-ferrous slag discharged from a process for smelting of non-ferrous metals including copper, zinc and lead is crushed, the crushed waste non-ferrous slag is mixed with carbon as a reducing agent and calcium carbonate ($CaCO_3$) as a reaction catalyst, and the mixture is subjected to a reduction reaction at a temperature below a melting temperature of iron, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$); the resulting material is crushed to separate iron and iron carbide from components such as alumina ($Al_2O_3$), calcium oxide (CaO), magnesium oxide (MgO), silica ($SiO_2$), zinc oxide (ZnO), copper oxide (CuO) and lead oxide (PbO); the crushed material is separated into fractions by particle size; and the fractions are subjected to wet magnetic separation and dry magnetic separation to separate and recover magnetic iron concentrates from the fractions. In the inventive method, a waste non-ferrous slag containing 35-45 wt % of iron discharged as an industrial waste from the process for smelting of non-ferrous metals including copper, zinc and lead is mixed with carbon as a reducing agent and calcium carbonate as a reaction catalyst at a temperature below a melting temperature of iron and the mixture is subjected to a reduction reaction, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$), followed by magnetic separation to easily concentrate, separate and recover iron contained in the waste non-ferrous slag, so that a high-grade iron concentrate containing more than 60% iron used as an iron or steel raw material can be recovered while not using large amounts of various types of slag formation agents causing an increase in the process costs. In addition, the use of calcium carbonate as the reaction catalyst accelerates the reduction reaction speed of iron oxides having a very low reactivity as being bound, in an amorphous state, to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, thereby shortening the process time. Further, the present invention relates to a method that can recover zinc contained in the waste non-ferrous slag through reduction and volatilization in the reduction reaction step as well as enables a residue as a non-magnetic material containing a trace of iron to be recycled as a cement material because it causes no environmental problem.

BACKGROUND ART

In general, a large amount of iron is contained in a waste non-ferrous slag discharged from both a pyrometallurgical process for smelting or refining concentrated copper and concentrated lead and a pyrometallurgical process for re-treating a residue discharged from a hydrometallurgical process of zinc. It is known that the content of iron to be recovered varies depending on the pyrometallurgical process for smelting the non-ferrous metal, but about 35-45 wt % of iron is contained in the waste non-ferrous slag.

Nevertheless, since the total content of non-ferrous metals including copper, zinc and lead leading to a deterioration of hot brittleness of iron or steel, which are contained in the waste non-ferrous slag, is more than 4 wt % to date, the waste non-ferrous slag is not used as an iron or steel raw material.

Thus, as conventional arts, although technologies for recovering iron from an iron or steel slag have been developed variously, a technique for recovering iron from a waste non-ferrous slag is not carried out.

Korean Patent Laid-Open Publication No. 2005-76556 discloses a method for recovering iron and manufacturing iron powder from a granulated water-quenched blast furnace slag. This invention is directed to a method that removes iron contained in a granulated water-quenched blast furnace slag, functioning as a factor influencing a deterioration in quality of the slag due to incomplete removal of iron from the slag generated during a pig iron manufacture in the iron manufacture process, and uses the same. In particular, the above Korean Patent invention is directed to method in which iron particles dispersed in the water-quenched blast furnace slag are subjected to magnetic separation to directly use the resulting magnetic iron concentrates as high-priced iron powder raw materials, or the iron particles are crushed and reduced to manufacture a high-value sponge-type iron powder. However, this method does not teach a solution to a problem of non-ferrous metals leading to a deterioration of hot brittleness of iron or steel as the characteristics of the waste non-ferrous slag, and cannot solve a problem in that iron components contained in the waste non-ferrous slag has a very low reduction potential as being bound to the non-ferrous metals in an amorphous state.

In addition, Korean Patent Laid-Open Publication No. 2002-36075 discloses a technology that extracts valuable metals from a non-ferrous metal sludge. This patent invention describes a technique for extracting a small amount of valuable metals contained in a non-ferrous metal sludge disposed of at industrial fields, but does not teach any treatment of large amounts of iron components contained in an amorphous state in a waste non-ferrous slag.

Moreover, Korean Patent Laid-Open Publication No. 2002-36075 discloses a method for separating iron from a slag generated as a by-product in a steel making process. The above patent describes a method that subjects a powered slag is subjected to magnetic separation according particle size to recover iron from the slag, thereby increasing the iron recovery rate, but does not teach any treatment large amounts of iron components contained in an amorphous state in the waste non-ferrous slag.

In the meantime, 2 tons of a waste non-ferrous slag per ton of produced copper is generated in a pyrometallurgical process for copper concentrate, 0.45 ton of a waste non-ferrous slag per ton of produced lead is generated in a pyrometallurgical process for lead concentrate, and 0.2 ton of waste non-ferrous slag per ton of produced zinc is generated in a pyrometallurgical process for re-treatment of a residue discharged in a hydrometallurgical process for zinc. This results in an environmental pollution, which causes a social problem.

However, a large amount of iron contained in the waste non-ferrous slag as an industrial waste is a resource that is too precious to be thrown away as a waste. Thus, it is required that iron should be recovered in terms of resource recycling in the state economy. Recovery and recycling of iron will be very useful in terms of effective utilization of resources.

A method for recovering iron from the waste non-ferrous slag as the industrial waste is roughly classified into a physical separation process and a pyrometallurgical process.

The physical separation process is a method that crushes a waste non-ferrous slag and subjects the crushed material to an oxidation reaction, followed by magnetic separation, thereby separating and recovering iron from the waste non-ferrous slag. However, such a physical separation process entails a shortcoming in that since iron oxides contained in the waste non-ferrous slag is very low in reactivity, it is very difficult for the crystal structure of the waste non-ferrous slag to be changed by the oxidation, so that the separation and recovery rate of iron is very low, which is less than 50%, and the recovered iron concentrate contain large amounts of non-ferrous metals including copper, zinc and lead contributing to a deterioration of hot brittleness of iron or steel as follows: copper is 1%, zinc is 2%, and lead is more than 1%. For this reason, in order to use the iron concentrate recovered by the physical separation process as an iron or steel raw material, the iron concentrate needs to be re-treated. Thus, the physical separation process of crushing a waste non-ferrous slag and subjecting the crushed material to an oxidation reaction, followed by magnetic separation has not been commercialized yet.

On the other hand, the pyrometallurgical process is a method that mixes a waste non-ferrous slag with fluxes as various slag composition regulators such as alumina ($Al_2O_3$), calcium oxide (CaO), magnesium oxide (MgO), and silica ($SiO_2$), and carbon as a reducing agent using a melting furnace, and then melts the mixture at a high temperature of about 1550~1600° C., which is more than a melting temperature of iron, thereby recovering iron from the waste non-ferrous slag. However, such a pyrometallurgical process has a shortcoming in that it is disadvantage in terms of cost effectiveness due to the use of fluxes as various slag composition regulators, the control of the process is difficult, and the process temperature is high. In addition, this pyrometallurgical process entails a disadvantage in that since non-ferrous metals including copper, zinc and lead leading to a deterioration of hot brittleness of iron or steel, which are contained in the waste non-ferrous slag, are recovered together with iron in a larger amount than in the above-mentioned physical separation process, a complex re-treatment is required for the waste non-ferrous slag to be used as an iron or steel raw material. Thus, any pyrometallurgical process of recovering iron from the waste non-ferrous slag as an industrial waste has not been commercialized yet.

Meanwhile, a method for recovering iron from an iron or steel slag containing 10-25 wt % of iron but not containing non-ferrous metals including copper, zinc and lead is largely classified into a physical separation process and a pyrometallurgical process. Such a method is relatively very simple technically as compared to the method for recovering iron from the waste non-ferrous slag as an industrial waste because it does not require a step of removing non-ferrous metals including copper, zinc and lead.

Accordingly, the present inventors have made extensive efforts to solve the above-described problems occurring in the prior art and, as a result, have found that a waste non-ferrous slag discharged from a process for smelting of non-ferrous metals including copper, zinc and lead is crushed, the crushed waste non-ferrous slag is mixed with carbon as a reducing agent and calcium carbonate ($CaCO_3$) as a reaction catalyst, the mixture is subjected to a reduction reaction at a temperature below a melting temperature of iron, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$); the resulting material is crushed to separate iron and iron carbide from components such as alumina ($Al_2O_3$), calcium oxide (CaO), magnesium oxide (MgO), silica ($SiO_2$), zinc oxide (ZnO), copper oxide (CuO) and lead oxide (PbO); the crushed material is separated into fractions by particle size; and the fractions are subjected to wet magnetic separation and dry magnetic separation to separate and recover magnetic iron concentrates in which the total content of non-ferrous metals including copper, zinc and lead is less than 1% from the fractions, so that the recovered iron concentrates can be used as iron or steel raw materials without being re-treated. Based on this finding, the present invention has been completed.

DISCLOSURE OF INVENTION

Technical Problem

Accordingly, an object of the present invention is to provide a method of separating and recovering iron from a waste non-ferrous slag, generated in a process for smelting of non-ferrous metals, including copper, zinc and lead, in which a reducing agent and a reaction catalyst are added to the crushed waste non-ferrous slag, and the mixture is subjected to a reduction reaction, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$); the resulting material is crushed to separate iron and iron carbide obtained by the reduction reaction from components such as alumina ($Al_2O_3$), calcium oxide (CaO), magnesium oxide (MgO), silica ($SiO_2$), zinc oxide (ZnO), copper oxide (CuO) and lead oxide (PbO); the crushed material is separated into fractions by particle size; and the fractions are subjected to wet magnetic separation and dry magnetic separation to separate and recover magnetic iron concentrates, in which the total content of non-ferrous metals including copper, zinc and lead is less than 1%, from the fractions.

Technical Solution

In order to achieve the above object, the present invention provides a method of separating and recovering iron from a waste non-ferrous slag, discharged from a process for smelting of non-ferrous metals, including copper, zinc and lead, by physical and chemical separation, the method including the steps of: (a) crushing the waste non-ferrous slag; (b) mixing the waste non-ferrous slag, crushed in step (a), with carbon as a reducing agent and calcium carbonate ($CaCO_3$) as a reaction catalyst, and subjecting the mixture to a reduction reaction, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$); (c) crushing the material resulting from step (b) to separate iron (Fe) and iron carbide ($Fe_2C$) obtained in step (b) from components such as alumina ($Al_2O_3$), calcium oxide (CaO), magnesium oxide (MgO), silica ($SiO_2$), zinc oxide (ZnO), copper oxide (CuO) and lead oxide (PbO); (d) separating the crushed material, obtained in step (c), into fractions according to particle size; and (e) subjecting the fractions, obtained in step (d), to wet magnetic separation and dry magnetic separation, to separate magnetic iron concentrates from the fractions, and mixing the magnetic iron concentrates with each other. In addition, the present invention provides a method that can recover zinc contained in the waste non-ferrous slag through reduction and volatilization in the reduction reaction step as well as enables a residue as a non-magnetic material containing a trace of iron to be recycled as a cement material because the residue causes no environmental problem.

Other features and embodiments of the present invention will be more apparent from the following detailed descriptions and the appended claims.

Advantageous Effects

According to the present invention, a waste non-ferrous slag discharged as an industrial waste from a process for smelting of non-ferrous metals including copper, zinc and lead is crushed, the crushed waste non-ferrous slag is mixed with carbon as a reducing agent and calcium carbonate ($CaCO_3$) as a reaction catalyst, and the mixture is subjected to a reduction reaction at a temperature below a melting temperature of iron, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$). Then, the resulting material is crushed to separate iron and iron carbide obtained by the reduction reaction from components such as alumina ($Al_2O_3$), calcium oxide (CaO), magnesium oxide (MgO), silica ($SiO_2$), zinc oxide (ZnO), copper oxide (CuO) and lead oxide (PbO), and the crushed material is separated into fractions by particle size and the fractions are subjected to wet magnetic separation and dry magnetic separation to separate and recover magnetic iron concentrates in which the total content of non-ferrous metals including copper, zinc and lead is less than 1% from the fractions. At present, a waste non-ferrous slag contains a very large amount of iron, e.g., 35-45 wt % of iron, but can recycle the waste non-ferrous slag not used as an iron or steel raw material since the total content of non-ferrous metals including copper, zinc and lead leading to a deterioration of hot brittleness of iron or steel, which are contained in the waste non-ferrous slag, is more than 4 wt %, so that the waste non-ferrous slag can used as a substitute for iron ore that all depends on import in view of the current situation of Korea as a poor natural resources country.

BEST MODE FOR CARRYING OUT THE INVENTION

Figure 1:
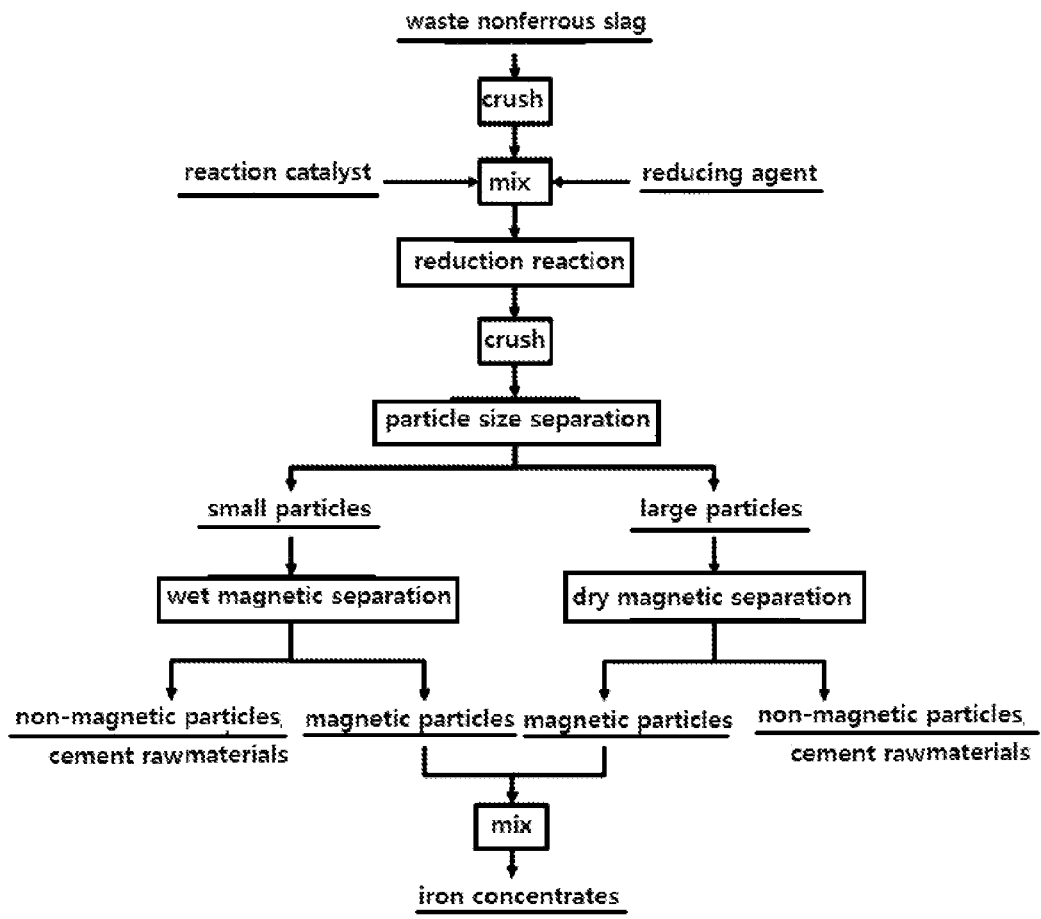
FIG. 1 is a schematic block diagram illustrating a process according to the present invention.
Figure 2:
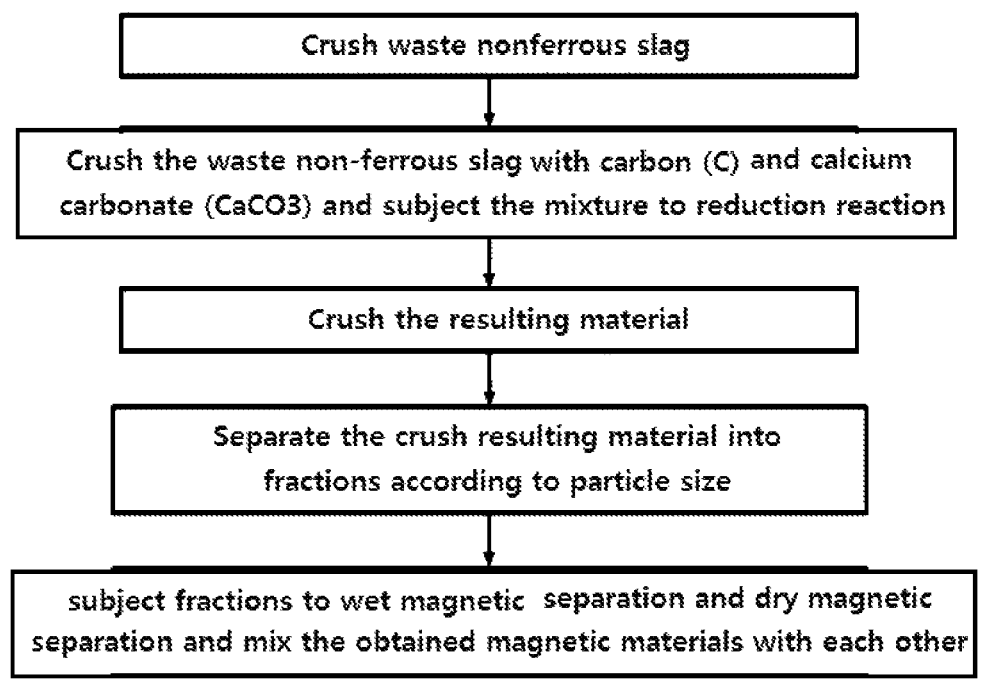
FIG. 2 is a flow block diagram illustrating a process of recovering iron from a waste non-ferrous slag according to the present invention.
Figure 3:
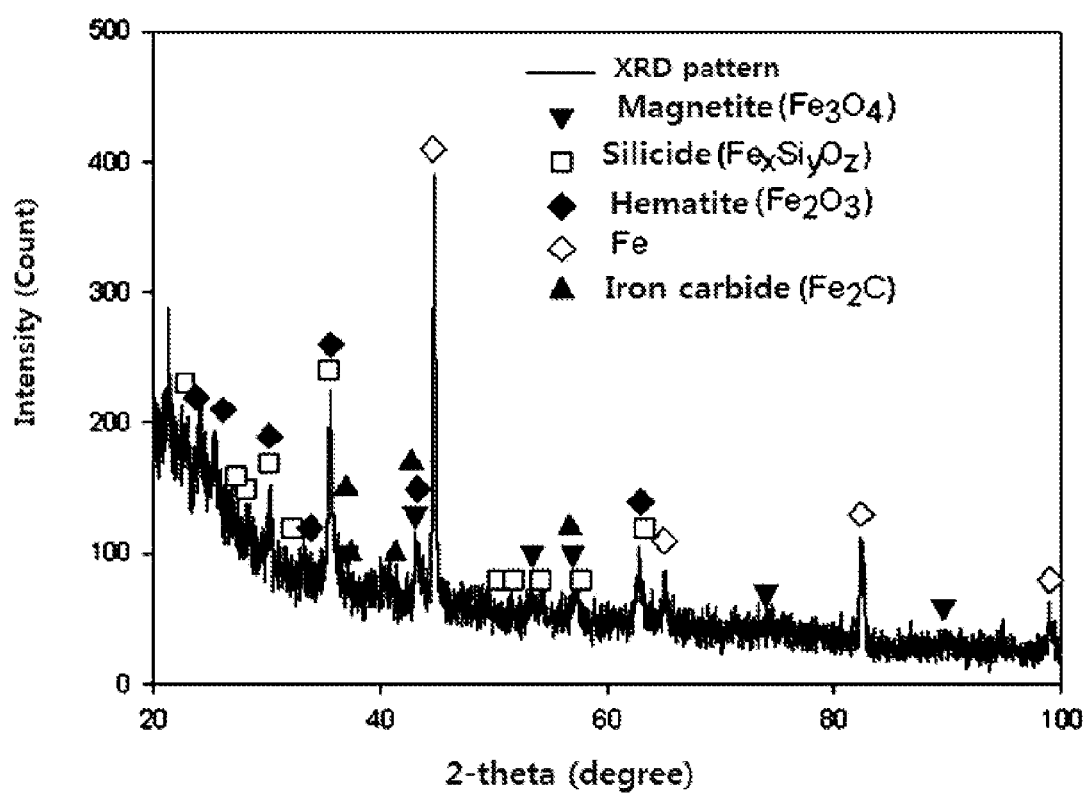
FIG. 3 is a graph illustrating an X-ray diffraction pattern of iron concentrates manufactured by a method of recovering iron from a waste non-ferrous slag according to an embodiment of the present invention.
Figure 4:
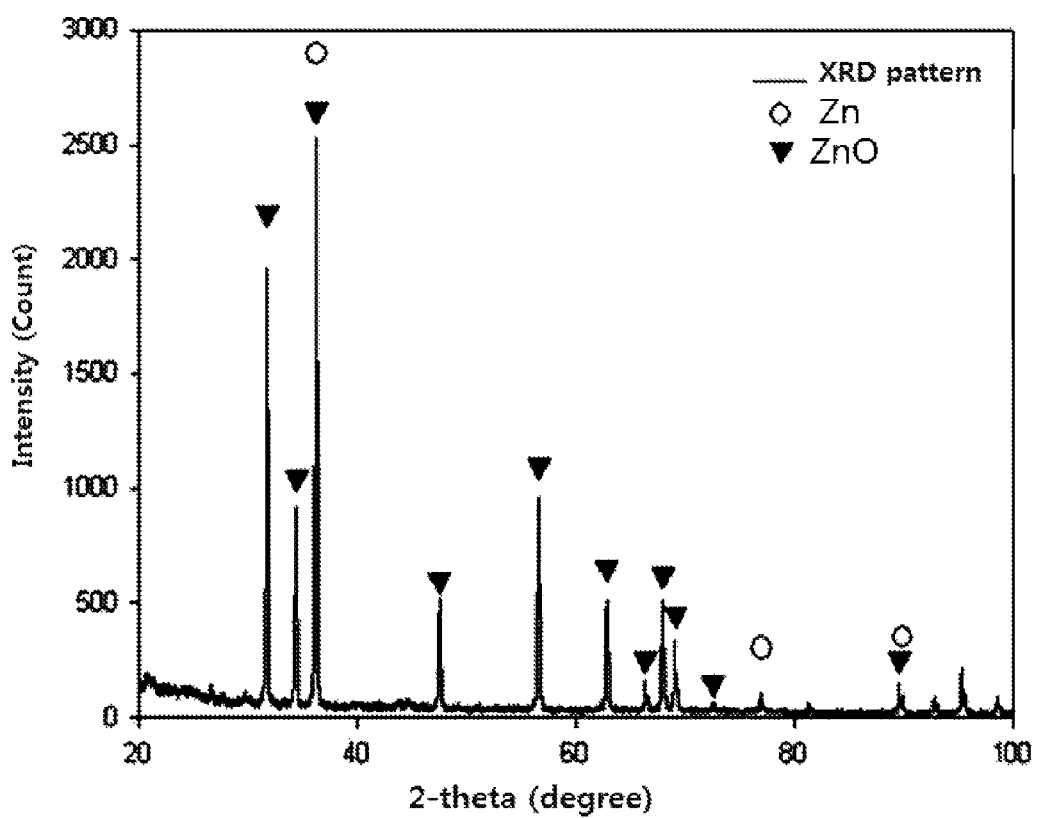
FIG. 4 is a graph illustrating an X-ray diffraction pattern of zinc concentrates recovered by a method of recovering iron from a waste non-ferrous slag according to an embodiment of the present invention.

In one aspect, the present invention is directed to a method of separating and recovering iron from a waste non-ferrous slag, discharged from a process for smelting of non-ferrous metals, including copper, zinc and lead, by physical and chemical separation, the method including the steps of: (a) crushing the waste non-ferrous slag; (b) mixing the waste non-ferrous slag, crushed in step (a), with carbon as a reducing agent and calcium carbonate ($CaCO_3$) as a reaction catalyst, and subjecting the mixture to a reduction reaction, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$); (c) crushing the material resulting from step (b) to separate iron and iron carbide obtained in step (b) from components such as alumina ($Al_2O_3$), calcium oxide (CaO), magnesium oxide (MgO), silica ($SiO_2$), zinc oxide (ZnO), copper oxide (CuO) and lead oxide (PbO); (d) separating the crushed material, obtained in step (c), into fractions according to particle size; and (e) subjecting the fractions, obtained in step (d), to wet magnetic separation and dry magnetic separation, to separate magnetic iron concentrates from the fractions, and mixing the magnetic iron concentrates with each other.

In the present invention, in step (a), the waste non-ferrous slag may be crushed to a particle size of from 150 to 203 μm in diameter. If the particle size of the waste non-ferrous slag is less than 150 μm, the reduction reaction time is slightly shortened, but the consumption of energy is rather increased, and thus there will be no advantage according to a reduction in the reduction reaction time. On the contrary, if the particle size of the waste non-ferrous slag exceeds 203 μm, there is disadvantages in that the reduction reaction time is extended and iron carbide components are increased, leading to a further increase in the process control time.

In the present invention, step (b) may be performed by uniformly mixing the waste non-ferrous slag with, based on the weight of the waste non-ferrous slag, 5-40 wt % of carbon and 3-20 wt % of calcium carbonate ($CaCO_3$), charging the mixture into an electric furnace to a thickness of 5-15 cm, and subjecting the charged mixture to a reduction reaction at a temperature of 1000-1300° C. for 30-90 minutes while passing air through the electric furnace at a rate of 0.5-1.5 l/min. Meanwhile, in step (b), 90%-95% of iron oxides contained in the waste non-ferrous slag are reduced to iron and iron carbide as magnetic materials. In particular, 90%-95% of iron oxides are reduced to iron as a magnetic material, and 5%-10% of iron oxides are reduced to iron carbide as a magnetic material.

In this case, carbon as a reducing agent is added to the crushed waste non-ferrous slag in order to convert amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$) by the reduction reaction. If the content of carbon added is less than 5 wt %, there is a disadvantage in that the reduction of the amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, are not completely performed, which makes it difficult to separate iron and iron carbide in step (c). Contrarily, if the content of carbon added exceeds 40 wt %, there is disadvantages in that the reduction rate of the amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, is slightly increased, but there will be no advantage according to an increases in the reduction rate.

In addition, calcium carbonate as a reaction catalyst is added to added to the crushed waste non-ferrous slag in order to accelerate the reduction reaction speed of the waste non-ferrous slag. If the content of calcium carbonate added is less than 3 wt %, the reduction reaction speed of the waste non-ferrous slag is not enhanced, and thus there will be no advantage according to the addition of the calcium carbonate. On the contrary, if the content of calcium carbonate added exceeds 20 wt %, the reduction reaction speed of the waste non-ferrous slag is enhanced but the reduction reaction effect is not significant, and thus there will be no advantage according to the addition of the calcium carbonate.

Further, the mixture of the crushed waste non-ferrous slag with carbon and calcium carbonate is charged into an electric furnace to a certain thickness in order to improve the efficiency of carbon as a reducing agent for the reduction of the amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag. If the thickness of the mixture is less than 5 cm, there is a disadvantage in that a carbon-reducing atmosphere in the sample is weakened and thus the reduction rate of the amorphous iron oxides in the waste non-ferrous slag is decreased. Contrarily, if the thickness of the mixture is exceeds 15 cm, the carbon-reducing atmosphere in the sample is strengthened and thus the reduction rate of the amorphous iron oxides in the waste non-ferrous slag is increased, but there is a disadvantage in that the rate of reduction, volatilization and recovery of zinc contained in the waste non-ferrous slag is decreased, which makes it difficult to separate iron and iron carbide in step (c).

Besides, if the melting temperature is less than 1000° C., there is a disadvantage in that the reduction of the amorphous iron oxides in the waste non-ferrous slag, are not completely performed and simultaneously the reduction and volatilization rate of zinc is decreased. On the contrary, if the melting temperature exceeds 1300° C., there is also a disadvantage in that the reduction reaction speed of the amorphous iron oxides in the waste non-ferrous slag is slightly increased but there occurs a phenomenon that the waste non-ferrous slag is rather fused in the furnace wall.

In addition, if the reduction reaction time of the mixture is less than 30 minutes, there is a disadvantage in that the reduction of the amorphous iron oxides in the waste non-ferrous slag, are not completely performed. Contrarily, if the reduction reaction time of the mixture exceeds 90 minutes, the reduction rate of the amorphous iron oxides in the waste non-ferrous slag is slightly increased, but there will be no advantage according to a slight increase in the reduction rate.

Also, if the air injection rate is less than 0.5 l/min, the reduction rate of the amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, is slightly increased, but there is a disadvantage in that the rate of reduction, volatilization and recovery of zinc contained in the waste non-ferrous slag is decreased, which makes it difficult to separate iron and iron carbide in step (c). On the contrary, if the air injection rate exceeds 1.5 l/min, the rate of reduction, volatilization and recovery of zinc contained in the waste non-ferrous slag is slightly increased, but there is a disadvantage in that the consumption of carbon as a reducing agent is rather increased.

In the present invention, step (c) is performed by crushing the material obtained in step (b) to a particle size of 61-104 μm in diameter. If the particle size of the waste non-ferrous slag is less than 61 μm, a degree of separation of iron and iron carbide is slightly increased but the generation of dust is rather increased, and thus there will be no advantage according to a slight increase in the degree of separation. Contrarily, if the particle size of the waste non-ferrous slag exceeds 104 μm, there is a disadvantage in that the degree of separation of iron and iron carbide is decreased.

In the meantime, the reason why the waste non-ferrous slag subjected to the reduction reaction is crushed to a particle size of 61-104 μm in diameter is that iron and iron carbide are efficiently separated from components such as alumina ($Al_2O_3$), calcium oxide (CaO), magnesium oxide (MgO), silica ($SiO_2$), zinc oxide (ZnO), copper oxide (CuO) and lead oxide (PbO).

In the present invention, step (d) is performed by separating the crushed material, obtained in step (c), into a fraction having a particle size of 61-74 μm and a fraction having a particle size of 75-104 μm using a sieve. The separation of the waste non-ferrous slag based on a particle size of 74 μm is aimed to efficiently concentrate, separate and recover iron in the magnetic separations performed in step (e).

In the present invention, step (e) is performed by subjecting a faction having a particle size of 61-74 μm to wet magnetic separation at a magnetic field strength of 2500-3500 Gauss to separate crystalline iron and iron carbide as magnetic materials, subjecting a fraction having a particle size of 75-104 μm to dry magnetic separation at a magnetic field strength of 200-400 Gauss to separate crystalline iron and iron carbide as magnetic materials, and mixing the obtained magnetic materials with each other.

In this case, subjection of a faction having a particle size of 61-74 μm to the wet magnetic separation is aimed to prevent any agglomeration occurring by the physical attraction force between particles due to a small particle size to increase the separation and recovery rates of iron as well as is aimed to prevent the generation of dust in the separation process to enable an environmentally friendly work.

Meanwhile, the wet magnetic separation is a method in which the crushed material is passed through a magnetic field together with water to separate a magnetic material and a non-magnetic material from each other, and the dry magnetic separation is a method in which the crushed material is passed through a magnetic field without using water to separate a magnetic material and a non-magnetic material from each other.

In this case, if the magnetic field strength is less than 2500 Gauss in the wet magnetic separation, there is a disadvantage in that the loss rate of iron and iron carbide as non-magnetic materials is increased, leading to a decrease in the recovery rate of iron as a magnetic material. On the contrary, if the magnetic field strength exceeds 3500 Gauss in the wet magnetic separation, the recovery rate of iron and iron carbide as magnetic materials is increased, but there is a disadvantage in that alumina ($Al_2O_3$), calcium oxide (CaO), magnesium oxide (MgO), silica ($SiO_2$), zinc oxide (ZnO), copper oxide (CuO) and lead oxide (PbO) are separated as magnetic materials together with iron and iron carbide, leading to a decrease in the grade of iron in the magnetic mixture.

In addition, if the magnetic field strength is less than 200 Gauss in the dry magnetic separation, there is a disadvantage in that the loss rate of iron and iron carbide as non-magnetic materials is increased, leading to a decrease in the recovery rate of iron as a magnetic material. On the contrary, if the magnetic field strength exceeds 400 Gauss in the dry magnetic separation, the recovery rate of iron and iron carbide as magnetic materials is increased, but there is a disadvantage in that alumina ($Al_2O_3$), calcium oxide (CaO), magnesium oxide (MgO), silica ($SiO_2$), zinc oxide (ZnO), copper oxide (CuO) and lead oxide (PbO) are separated as magnetic materials together with iron and iron carbide, leading to a decrease in the grade of iron in the magnetic mixture.

In this case, the magnetic materials and the non-magnetic materials are separated from each other in the wet magnetic separation and the dry magnetic separation, and then the magnetic materials in which iron and iron carbide are concentrated are mixed with each other, so that the mixture is used as an iron or steel raw material, and the non-magnetic material having a very low content of iron is used as a cement raw material.

Resultantly, the present invention is significant since it suggests an energy-saving and environmentally friendly technology that provides a method which can use calcium carbonate as a reaction catalyst to accelerate the reduction reaction speed of iron oxides having a very low reactivity as being bound, in an amorphous state, to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, thereby shortening the process time, and simultaneously can recover zinc contained in the waste non-ferrous slag through reduction and volatilization in the reduction reaction step as well as enables a residue as a non-magnetic material containing a trace of iron to be recycled as a resource because it causes no environmental problem. In addition, the present invention is meaningful since it suggests a technology that enables industrial wastes thrown away to be recycled as resources.

EXAMPLES

Hereinafter, the present invention will be described in further detail with reference to examples. It will be obvious to those skilled in the art that these examples are illustrative purposes only and are not to be construed to limit the scope of the present invention.

Example 1

A waste non-ferrous slag was crushed to a particle size of 150-203 μm in diameter. Then, the crushed waste non-ferrous slag was mixed with carbon as a reducing agent and calcium carbonate ($CaCO_3$) as a reaction catalyst. At this time, the crushed waste non-ferrous slag was uniformly mixed with, based on the weight of the waste non-ferrous slag, 25 wt % of carbon and 10 wt % of calcium carbonate ($CaCO_3$) using a V-mixer (Hanyang Science, Korea). The uniformly mixed raw material was charged into an electric furnace to a thickness of 5 cm, and the charged mixture was subjected to a reduction reaction at a temperature of 1250° C. for 30 minutes while injecting air into the electric furnace at a rate 1.0 l/min. The thus obtained solid sample was crushed to a particle size of 61-104 μm in diameter, and the resulting crushed material was separated into a fraction having a particle size of 61-74 μm and a fraction having a particle size of 75-104 μm. Subsequently, the faction having a particle size of 61-74 μm was subjected to wet magnetic separation at a magnetic field strength of 2500 Gauss to separate crystalline iron and iron carbide as magnetic materials, and the fraction having a particle size of 75-104 μm was subjected to dry magnetic separation at a magnetic field strength of 300 Gauss to separate crystalline iron and iron carbide as magnetic materials. Thereafter, the magnetic materials obtained by the wet magnetic separation and the dry magnetic separation, respectively, were mixed with each other so that magnetic iron concentrates were separated and recovered from the waste non-ferrous slag.

As a result, the amounts of iron and zinc contained in 500 g of a waste non-ferrous slag were 208.0 g and 28.0 g, respectively. The amount of iron existing in the iron concentrates as magnetic materials recovered by the present invention was 193.8 g while the total content of non-ferrous metals including copper, zinc and lead existing in the iron concentrates is less than 1%, and the amount of zinc existing in zinc concentrates as dust is 27.4 g, which shows that all of iron and zinc had a recovery rate of more than 90%.

Example 2

A waste non-ferrous slag was crushed to a particle size of 150-203 μm in diameter. Then, the crushed waste non-ferrous slag was mixed with carbon as a reducing agent and calcium carbonate ($CaCO_3$) as a reaction catalyst. At this time, the crushed waste non-ferrous slag was uniformly mixed with, based on the weight of the waste non-ferrous slag, 30 wt % of carbon and 5 wt % of calcium carbonate ($CaCO_3$) using a V-mixer (Hanyang Science, Korea). The uniformly mixed raw material was charged into an electric furnace to a thickness of 10 cm, and the charged mixture was subjected to a reduction reaction at a temperature of 1150° C. for 60 minutes while injecting air into the electric furnace at a rate 1.5 l/min. The thus obtained solid sample was crushed to a particle size of 61-104 μm in diameter, and the resulting crushed material was separated into a fraction having a particle size of 61-74 μm and a fraction having a particle size of 75-104 μm. Subsequently, the faction having a particle size of 61-74 μm was subjected to wet magnetic separation at a magnetic field strength of 3000 Gauss to separate crystalline iron and iron carbide as magnetic materials, and the fraction having a particle size of 75-104 μm was subjected to dry magnetic separation at a magnetic field strength of 250 Gauss to separate crystalline iron and iron carbide as magnetic materials. Thereafter, the magnetic materials obtained by the wet magnetic separation and the dry magnetic separation, respectively, were mixed with each other so that magnetic iron concentrates were separated and recovered from the waste non-ferrous slag.

As a result, the amounts of iron and zinc contained in 1000 g of a waste non-ferrous slag were 446.4 g and 21.0 g, respectively. The amount of iron existing in the iron concentrates as magnetic materials recovered by the present invention was 404.7 g while the total content of non-ferrous metals including copper, zinc and lead existing in the iron concentrates is less than 1%, and the amount of zinc existing in zinc concentrates as dust is 19.9 g, which shows that all of iron and zinc had a recovery rate of more than 90%.

Example 3

A waste non-ferrous slag was crushed to a particle size of 150-203 μm in diameter. Then, the crushed waste non-ferrous slag was mixed with carbon as a reducing agent and calcium carbonate ($CaCO_3$) as a reaction catalyst. At this time, the crushed waste non-ferrous slag was uniformly mixed with, based on the weight of the waste non-ferrous slag, 10 wt % of carbon and 15 wt % of calcium carbonate ($CaCO_3$) using a V-mixer (Hanyang Science, Korea). The uniformly mixed raw material was charged into an electric furnace to a thickness of 15 cm, and the charged mixture was subjected to a reduction reaction at a temperature of 1100° C. for 90 minutes while injecting air into the electric furnace at a rate 0.5 l/min. The thus obtained solid sample was crushed to a particle size of 61-104 μm in diameter, and the resulting crushed material was separated into a fraction having a particle size of 61-74 μm and a fraction having a particle size of 75-104 μm. Subsequently, the faction having a particle size of 61-74 μm was subjected to wet magnetic separation at a magnetic field strength of 3500 Gauss to separate crystalline iron and iron carbide as magnetic materials, and the fraction having a particle size of 75-104 μm was subjected to dry magnetic separation at a magnetic field strength of 350 Gauss to separate crystalline iron and iron carbide as magnetic materials. Thereafter, the magnetic materials obtained by the wet magnetic separation and the dry magnetic separation, respectively, were mixed with each other so that magnetic iron concentrates were separated and recovered from the waste non-ferrous slag.

As a result, the amounts of iron and zinc contained in 1500 g of a waste non-ferrous slag were 643.5 g and 39.6 g, respectively. The amount of iron existing in the iron concentrates as magnetic materials recovered by the present invention was 581.8 g while the total content of non-ferrous metals including copper, zinc and lead existing in the iron concentrates is less than 1%, and the amount of zinc existing in zinc concentrates as dust is 36.7 g, which shows that all of iron and zinc had a recovery rate of more than 90%.

The amount of respective samples added and the recovery rate in the above Examples 1, 2 and 3 were shown in Tables 1, 2 and 3 below.

TABLE 1

| Samples added | | | | | | Recovery | | Content (wt %) | | | |
|---|---|---|---|---|---|---|---|---|---|---|---|
| Waste non-ferrous slag | | Carbon (C) | | Calcium carbonate ($CaCO_3$) | | rate (%) | | | | | |
| Ratio (%) | Amount (g) | Ratio (%) | Amount (g) | Ratio (%) | Amount (g) | Fe | Zn | Fe | Zn | Cu | Pb |
| 74.1 | 500 | 18.5 | 125 | 7.4 | 50 | 93.2 | 97.9 | 60.7 | 0.2 | 0.63 | 0.04 |

Note)
1. The added samples are materials of carbon and calcium carbonate, added to an initial waste non-ferrous slag.
2. The recovery rate is a recovery rate of iron and zinc, obtained by Example 1.
3. The content is a weight ratio of respective components in a final product.

TABLE 2

| Samples added | | | | | | Recovery | | Content (wt %) | | | |
|---|---|---|---|---|---|---|---|---|---|---|---|
| Waste non-ferrous slag | | Carbon (C) | | Calcium carbonate ($CaCO_3$) | | rate (%) | | | | | |
| Ratio (%) | Amount (g) | Ratio (%) | Amount (g) | Ratio (%) | Amount (g) | Fe | Zn | Fe | Zn | Cu | Pb |
| 74.1 | 1000 | 22.2 | 300 | 3.7 | 50 | 90.4 | 94.8 | 62.7 | 0.17 | 0.62 | 0.04 |

Note)
1. The added samples are materials of carbon and calcium carbonate, added to an initial waste non-ferrous slag.
2. The recovery rate is a recovery rate of iron and zinc, obtained by Example 2.
3. The content is a weight ratio of respective components in a final product.

TABLE 3

| Samples added | | | | | | Recovery rate (%) | | Content (wt %) | | | |
|---|---|---|---|---|---|---|---|---|---|---|---|
| Waste non-ferrous slag | | Carbon (C) | | Calcium carbonate (CaCO₃) | | | | | | | |
| Ratio (%) | Amount (g) | Ratio (%) | Amount (g) | Ratio (%) | Amount (g) | Fe | Zn | Fe | Zn | Cu | Pb |
| 80.0 | 1500 | 8.0 | 150 | 12.0 | 225 | 90.4 | 92.7 | 61.3 | 0.31 | 0.52 | 0.04 |

Note)
1. The added samples are materials of carbon and calcium carbonate, added to an initial waste non-ferrous slag.
2. The recovery rate is a recovery rate of iron and zinc, obtained by Example 3.
3. The content is a weight ratio of respective components in a final product.

INDUSTRIAL APPLICABILITY

As described above, according to a method of separating and recovering iron from a waste non-ferrous slag, discharged from a process for smelting of non-ferrous metals, including copper, zinc and lead, by physical and chemical separation, of the present invention, the waste non-ferrous slag is crushed, the crushed waste non-ferrous slag is mixed with carbon and calcium carbonate ($CaCO_3$), and the mixture is subjected to a reduction reaction at a temperature below a melting temperature of iron, thereby converting amorphous iron oxides, bound to alumina ($Al_2O_3$), calcium oxide (CaO), magnesium oxide (MgO), silica ($SiO_2$), and the like in the waste non-ferrous slag, to crystalline iron (Fe) and iron carbide ($Fe_2C$). Then, the resulting material is crushed to separate iron and iron carbide from components such as alumina ($Al_2O_3$), calcium oxide (CaO), magnesium oxide (MgO), silica ($SiO_2$), and the like, the crushed material is separated into fractions by particle size, and the fractions are subjected to wet magnetic separation and dry magnetic separation to separate and recover high-grade magnetic iron concentrates from the fractions. In the inventive method, the use of calcium carbonate as the reaction catalyst accelerates the reduction reaction speed of iron oxides contained in an amorphous state in the waste non-ferrous slag to thereby shorten the process time as well as lowers the process temperature to make the work easier. In addition, the present invention enables the waste non-ferrous slag to be recycled as an iron or steel raw material as a resource so that utilization of an iron resource can be maximized in view of the current situation of Korea as a poor natural resources country, and thus the present invention can be widely used in recycling of industrial wastes associated with recovery of iron in both a non-ferrous metal smelting field and an iron or steel smelting field Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A method of separating and recovering iron from a waste non-ferrous slag, discharged from a process for smelting of non-ferrous metals, including copper, zinc and lead, by physical and chemical separation, the method comprising the steps of:
   (a) crushing the waste non-ferrous slag;
   (b) mixing the waste non-ferrous slag, crushed in step (a), with carbon as a reducing agent and calcium carbonate ($CaCO_3$) as a reaction catalyst, in amounts, based on the weight of the waste non-ferrous slag, of 5-40 wt % of carbon and 3-20 wt % of calcium carbonate ($CaCO_3$), charging the mixture into an electric furnace to a thickness of 5-15 cm, and subjecting the charged mixture to a reduction reaction at a temperature of 1000-1300° C. for 30-90 minutes while passing air through the electric furnace at a rate of 0.5-1.5 l/min, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$);
   (c) crushing the material resulting from step (b) to separate iron (Fe) and iron carbide ($Fe_2C$) obtained in step (b) from components such as alumina ($Al_2O_3$), calcium oxide (CaO), magnesium oxide (MgO), silica ($SiO_2$), zinc oxide (ZnO), copper oxide (CuO) and lead oxide (PbO);
   (d) separating the crushed material, obtained in step (c), into fractions according to particle size; and
   (e) subjecting the fractions, obtained in step (d), to wet magnetic separation and dry magnetic separation, to separate magnetic iron concentrates from the fractions, and mixing the magnetic iron concentrates with each other.

2. The method of claim 1, wherein the waste non-ferrous slag is crushed in step (a) to a particle size of 150-203 μm in diameter.

3. The method of claim 1, wherein step (c) is performed by crushing the material obtained in step (b) to a particle size of 61-104 μm in diameter.

4. The method of claim 1, wherein step (d) is performed by separating the crushed material, obtained in step (c), into a fraction having a particle size of 61-74 μm and a fraction having a particle size of 75-104 μm.

5. The method of claim 1, wherein step (e) is performed by subjecting a faction having a particle size of 61-74 μm to wet magnetic separation at a magnetic field strength of 2500-3500 Gauss to separate crystalline iron and iron carbide as magnetic materials, subjecting a fraction having a particle size of 75-104 μm to dry magnetic separation at a magnetic field strength of 200-400 Gauss to separate crystalline iron and iron carbide as magnetic materials, and mixing the obtained magnetic materials with each other.

6. A method of separating and recovering iron from a waste non-ferrous slag, discharged from a process for smelting of non-ferrous metals, including copper, zinc and lead, by physical and chemical separation, the method comprising the steps of:

(a) crushing the waste non-ferrous slag;
(b) mixing the waste non-ferrous slag, crushed in step (a), with carbon as a reducing agent and calcium carbonate ($CaCO_3$) as a reaction catalyst, and subjecting the mixture to a reduction reaction, thereby converting amorphous iron oxides, bound to alumina ($Al_2O_3$), calcium oxide (CaO), magnesium oxide (MgO), silica ($SiO_2$), zinc oxide (ZnO), copper oxide (CuO) and lead oxide (PbO) in the waste non-ferrous slag, to crystalline iron (Fe) and iron carbide ($Fe_2C$);
(c) crushing the material resulting from step (b) to separate iron (Fe) and iron carbide ($Fe_2C$) obtained in step (b) from components such as alumina ($Al_2O_3$), calcium oxide (CaO), magnesium oxide (MgO), silica ($SiO_2$), zinc oxide (ZnO), copper oxide (CuO) and lead oxide (PbO);
(d) separating the crushed material, obtained in step (c), into fractions according to particle size; and
(e) subjecting the fractions, obtained in step (d), to wet magnetic separation and dry magnetic separation, to separate magnetic iron concentrates from the fractions, and mixing the magnetic iron concentrates with each other, wherein step (e) is performed by subjecting a faction having a particle size of 61-74 μm to wet magnetic separation at a magnetic field strength of 2500-3500 Gauss to separate crystalline iron and iron carbide as magnetic materials, subjecting a fraction having a particle size of 75-104 μm to dry magnetic separation at a magnetic field strength of 200-400 Gauss to separate crystalline iron and iron carbide as magnetic materials, and mixing the obtained magnetic materials with each other.

\* \* \* \* \*